US010307900B1

(12) United States Patent
Harris et al.

(10) Patent No.: US 10,307,900 B1
(45) Date of Patent: Jun. 4, 2019

(54) QUICK CONNECT LINER LATCH SYSTEM ASSEMBLY OIL WELL PRODUCTION LINER INSERTION WITH WIRE LINE

(76) Inventors: Robert Harris, Anchorage, AK (US); Carl Diller, Anchorage, AK (US); Candice English, Anchorage, AK (US)

( * ) Notice: Subject to any disclaimer, the term of this patent is extended or adjusted under 35 U.S.C. 154(b) by 2387 days.

(21) Appl. No.: 13/200,211

(22) Filed: Sep. 20, 2011

(51) Int. Cl.
*F16L 37/127* (2006.01)
*B25B 27/00* (2006.01)

(52) U.S. Cl.
CPC ................................ *B25B 27/0021* (2013.01)

(58) Field of Classification Search
CPC . B25B 27/0021; B25B 27/0064; B25B 27/10; D03B 23/047; Y10T 29/53652
USPC .... 29/235, 237, 234, 238, 245, 243.55, 271, 29/281.5
See application file for complete search history.

(56) References Cited

U.S. PATENT DOCUMENTS 3,708,873 A * 1/1973 Floyd, Jr. ........................ 29/600
3,815,940 A * 6/1974 Luckenbill .......... F16L 37/0925 285/105
6,158,532 A * 12/2000 Logan et al. ................. 175/320
7,134,204 B2 * 11/2006 Corbett, Jr. ......... F16L 37/0845 29/447
2006/0082136 A1 * 4/2006 Sutherland et al. ............ 285/47
2011/0089685 A1 * 4/2011 McKee ................. E21B 17/046 285/313

* cited by examiner

*Primary Examiner* — David P Bryant
*Assistant Examiner* — Nirvana Deonauth
(74) *Attorney, Agent, or Firm* — Michael J. Tavella

(57) ABSTRACT

A quick connect liner latch system assembly (QCLL). The QCLL latches each joint of a slick line deployed liner together quickly and easily. This system can set an anchor in an existing well bore at a shallow depth and run a new liner in the well with a slick line unit using the QCLL system. It is a safer operation for the workers and environment and cost savings to the operator. The QCLL has two main sections that are locked together to form the full QCLL. The upper and lowers sections are locked together using a body lock ring. The units are not threaded together, which eliminates the need for a conventional rig for installation. The QCLL is unique because the inside diameter (ID) of the latch can remain large enough to accommodate a standard liner wiper plug for the weight of the liner being run into the well.

16 Claims, 10 Drawing Sheets

QUICK CONNECT LINER LATCH SYSTEM ASSEMBLY OIL WELL PRODUCTION LINER INSERTION WITH WIRE LINE

CROSS REFERENCE TO RELATED APPLICATIONS

Not Applicable

STATEMENT REGARDING FEDERALLY SPONSORED RESEARCH AND DEVELOPMENT

Not Applicable

BACKGROUND OF THE INVENTION

1. Field of the Invention

This invention relates to quick connect liner latch system assemblies and particularly quick connect liner latch system assemblies for use in oil well production liners.

2. Description of the Prior Art

When remedial work or repair work is needed for damaged or compromised well casing or production tubing, a liner is often used for the repairs. Two specific types of repairs are considered herein. The first is the installation of a scab liner, where the deployed pipe is set on the bottom (plug back total depth (PBTD)); landed on a profile nipple within an existing completion; or hung in tubing or casing with a CT liner hanger. In practice today, a conventional cement job can then be performed to permanently place the new liner in the well.

The second application discussed here is an extended length straddle, where an interval within the well bore (production tubing or casing) requires remediation, repair or production modification, such as a water or gas shut off. This type of repair is normally used for intervals greater than 35 feet in length.

For both of these types of interventions the industry standard uses screw-together pipe. For cemented and uncemented scab liners the use of a drilling rig, work over rig, or work platform is used to make up and run the liner in a single trip. The "footprint", i.e., support equipment and manpower is typically large. Thus, these types of installations are costly and time consuming.

BRIEF DESCRIPTION OF THE INVENTION

The instant invention overcomes the need for a large "footprint" for making repairs. The invention is part of a "slick line deployed liner" (SLDL), which is a lower cost and a "rig-less" intervention on wells requiring remedial work to repair damaged or compromised casing or production tubing.

The SLDL allows the operator to deploy the liner in the well using a slick line (S/L) unit and lubricator requiring only a three-man crew.

Unlike screw-together pipe, the SLDL is delivered to location as a modular "snap together" system. While the modular system is not new to the industry, the method of deployment and intended use is.

In the case of a PBTD remediation, prior to picking up any liner a "bottom" must be created in the well. If the PBTD is accessible with a S/L (e.g., for a hole angle less than 70 degrees), the liner can be run in with each modular section snapping into the next until the desired length of liner is in the well. If the PBTD cannot be reached with S/L or if the liner is to be set "off bottom" or "hung", a device is introduced into the well bore prior to picking up the first joint of liner. This device is known as a "releasable anchor". It is unique in that it acts as a temporary bottom to "land" the modular liner sections on until such time it is ready to be released. Once released, the anchor will collapse to a diameter smaller than the pipe in which it is set. Once the anchor is released, the liner can be conveyed to the desired "setting depth" at PBTD, landed on a nipple profile, or hung in a predetermined place in the well.

Once the S/L has placed the desired length of liner in the well, a means to attach to the liner, release the anchor, and place liner at setting depth is needed. To do this, a coil-tubing unit (CTU) is used. Again, in this operation no work platform is needed. Thus, this operation also saves support equipment and uses a smaller footprint.

Because the liner is to be cemented, the conduit used to place the cement is the CTU. The CTU has the capacity to engage the liner, release the anchor, run to depth, release from the liner, and cement it in place. These steps are conducted in a single trip.

To snap the liner sections together, the SLDL uses the quick connect liner latch system assembly (QCLL). The QCLL is a device that latches each joint of the liner together quickly and easily. This system is to able to set an anchor in an existing well bore at a shallow depth and run a new liner in the well with a wire line unit using the QCLL system. It is a safer operation for the workers and environment and huge cost savings to the operator.

The QCLL is a device that has two main components: an upper section and a lower section-that are locked together to form the full QCLL. The upper and lower sections are locked together using a body lock ring. Because the units are not threaded together, the need for a conventional rig for installation is eliminated. The QCLL is unique because the inside diameter (ID) of the latch can remain large enough to accommodate a standard liner wiper plug for the weight of the liner being run into the well. To accomplish this, a specially designed running tool was developed. Although there are several snap together latches commercially available, there are none that have an ID that allows the passage of a liner wiper plug system. Although there have been liners latched together before in oil wells, none have been cemented using a standard liner wiper plug system for the pipe size being run. Using the specially designed QCLL system and running procedures brings a new method of relining old well bores with new pipe that enables the largest ID possible to be maintained for more well intervention work.

DETAILED DESCRIPTION OF THE INVENTION

Figure 1:
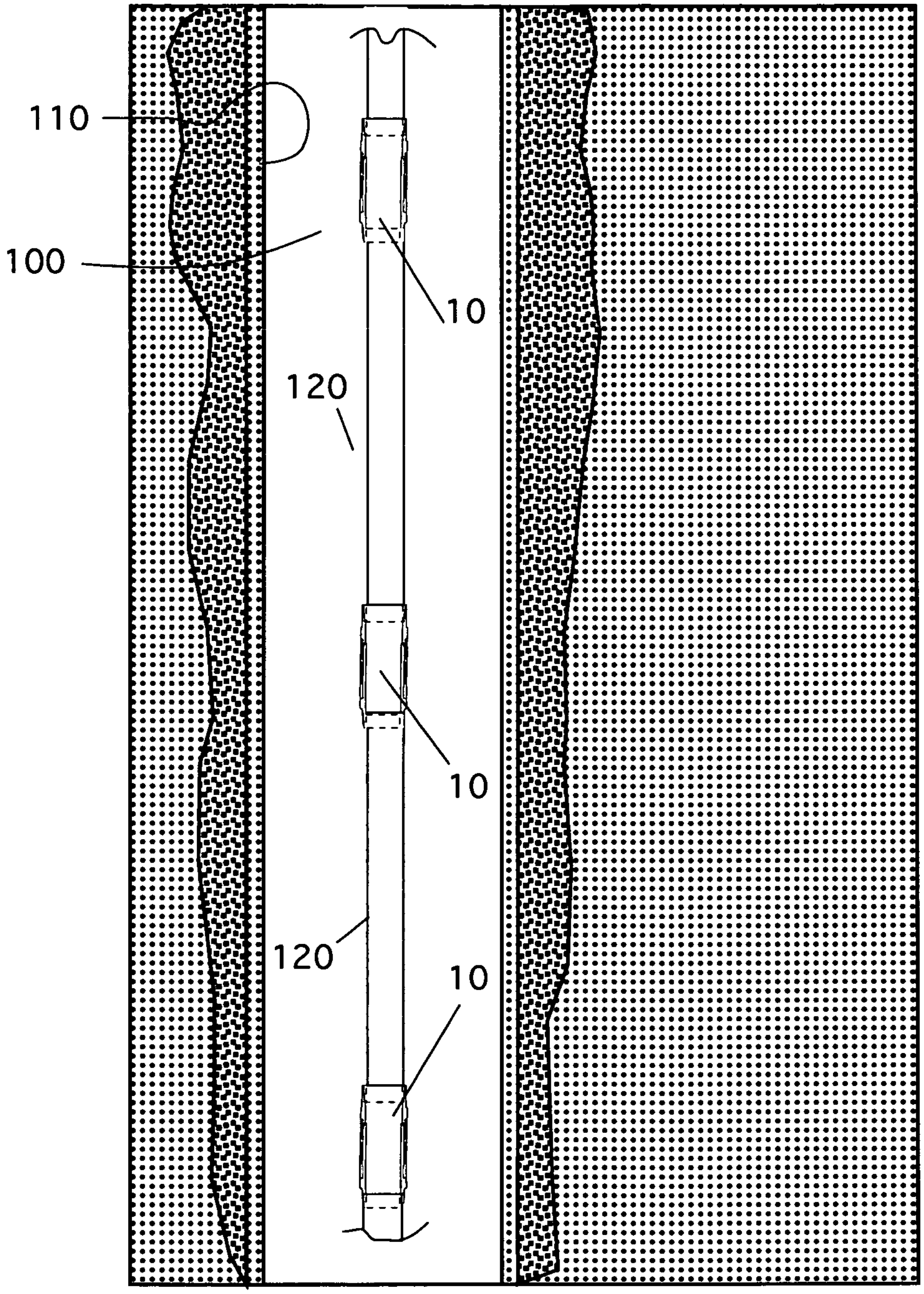
FIG. 1 is a cross-sectional view of a well showing a section of deployed liner using the QCLL system to connect the liner sections.

Referring now to FIG. 1, a cross-sectional view of a well 100 showing a section of deployed liner using the QCLL system 10 to connect the liner sections 120 is shown. The well 100 is typically lined with a casing 110. The liner sections 120 are run into the well, as described below. To connect liner sections together, the QCLL system 10 is used at each joint of liner sections, as shown. The use of the QCLL eliminated the need for a rig to screw liner sections together. The QCLL 10 simply snaps together the liner sections being deployed into the well.

Figure 2:
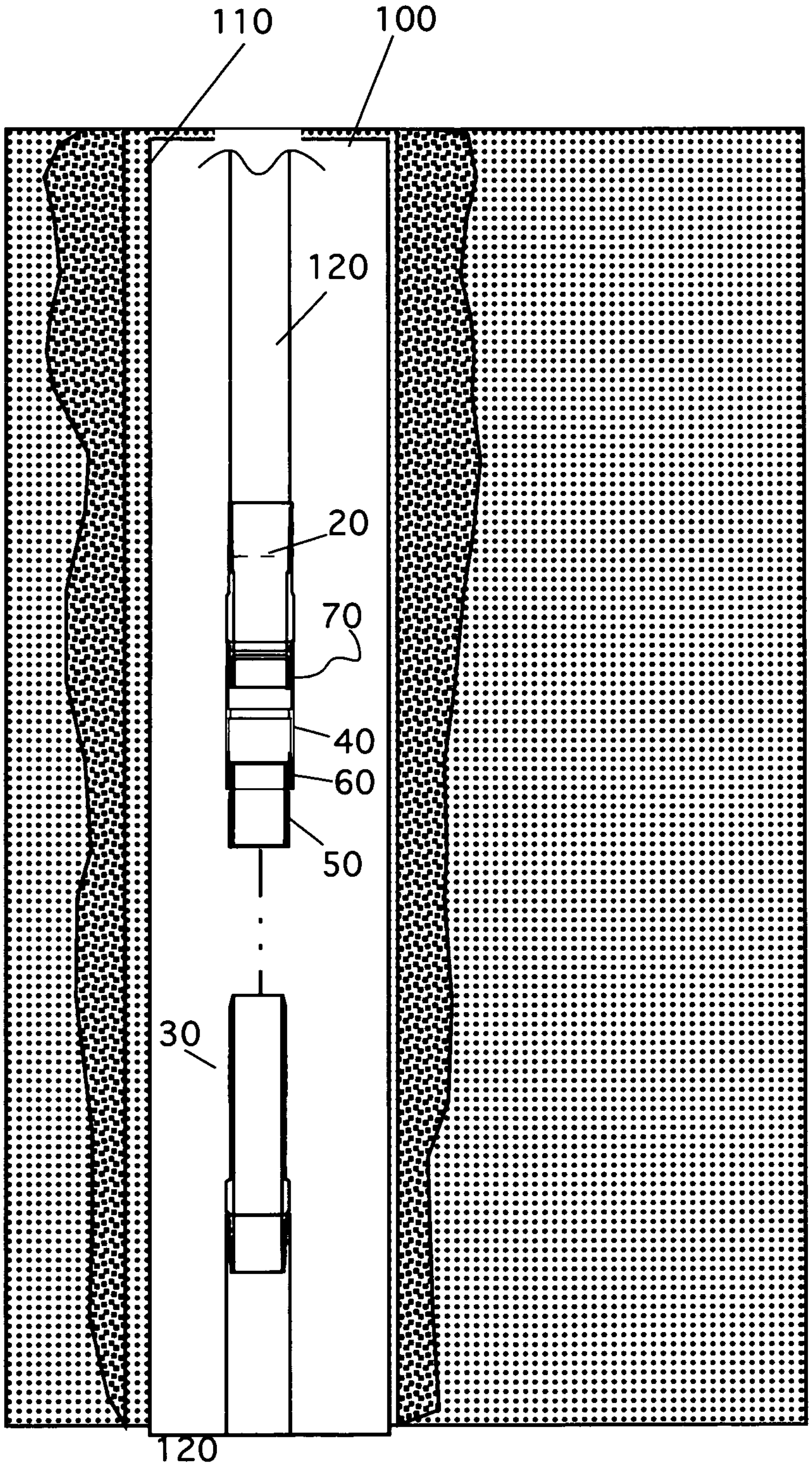
FIG. 2 is a detail view of the section of deployed liner showing an enlarged view of the QCLL system.

FIG. 2 is a detail view of the section of deployed liner showing an enlarged view of the QCLL system. Here, the QCLL is shown attached to two sections of liner 120. In this view, the lower section of the QCLL, includes only the lower mandrel 30 attached to a section of liner 120. The upper part of the QCLL, which is the crossover and packing nut 20, body lock ring (BLR) 60, packing 70, BLR retaining nut (guide or guide shoe) 50, and body lock ring and packing housing 40 is attached to an upper section of liner. In this view, the two sections are ready to be snapped together, as described below.

Figure 3:
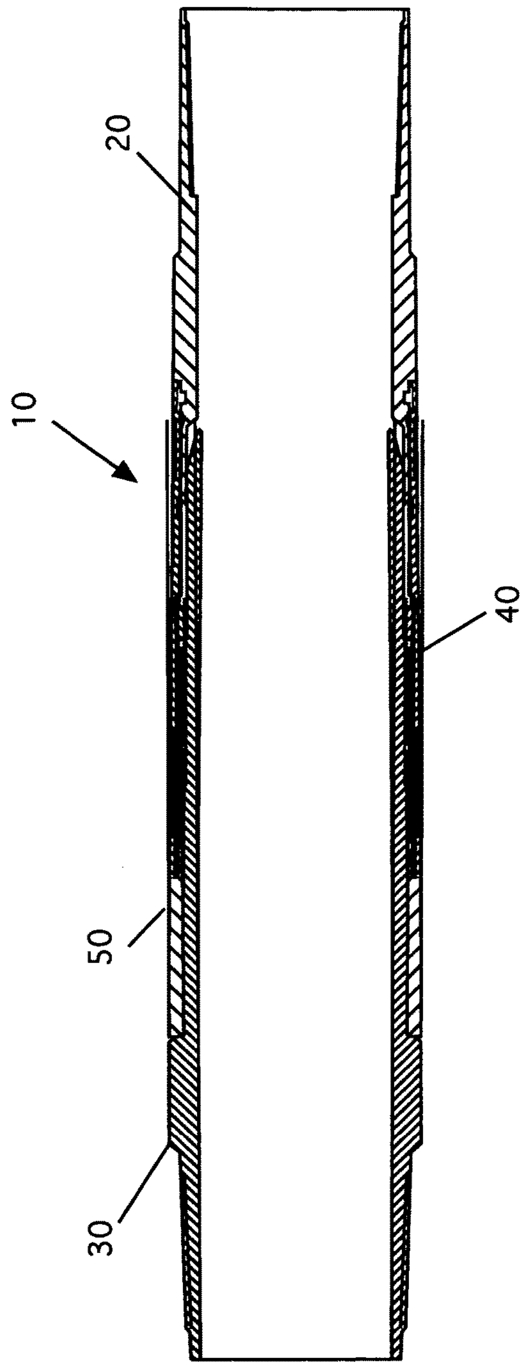
FIG. 3 is a cross-sectional view of an assembled QCLL.

FIG. 3 is a cross-sectional view of an assembled QCLL. Here, all of the components of the QCLL are shown assembled. At the top of the QCLL is a crossover and packing nut assembly 20, which is detailed in FIG. 4. At the bottom of the QCLL is the lower mandrel 30. The lower mandrel is detailed in FIGS. 6 and 6*a*. The lower mandrel 30 is connected to the crossover and packing nut assembly 20 using a body lock ring 40. The body lock ring 40 is secured using a retaining nut "guide" or "guide shoe" 50. A packing unit 70 is also installed in the upper section on the BLR and packing housing 40 as shown.

Figure 4:
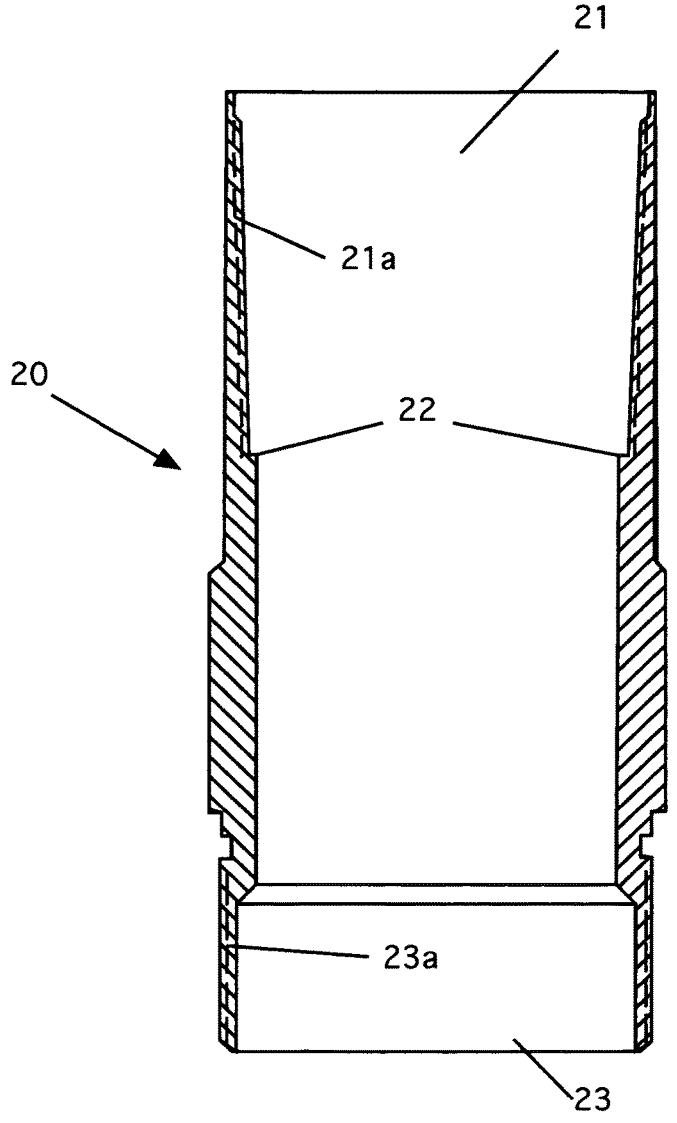
FIG. 4 is an enlarged detail cross-section of the crossover and packing nut portion of the QCLL.

FIG. 4 is an enlarged detail cross-section of the crossover and packing nut portion of the QCLL. In this figure, the crossover and packing nut assembly 20 is shown. At the top is a tapered opening 21 that receives a liner section. This section is threaded with threads 21*a* that attach to the liner. The interior of the crossover and packing nut assembly 20 has a ledge 22 onto which the liner seats. At the other end of the crossover and packing nut assembly 20 is an opening 23 that accepts the upper section of the mandrel 30. This opening is also threaded with threads 23*a*. The threads 23*a* make up to the box end of the BLR and packing housing 40.

Figure 5:
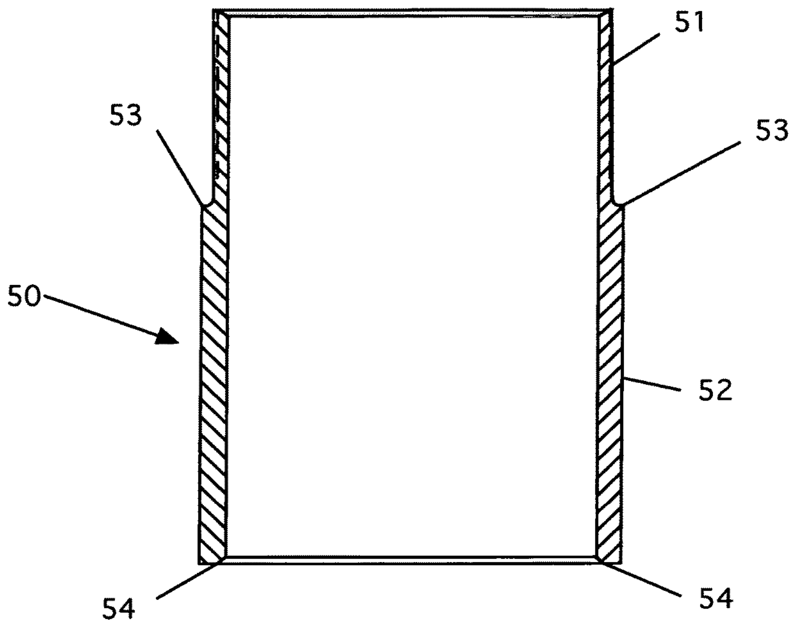
FIG. 5 is an enlarged detail cross-section of the body lock ring retaining nut or guide portion of the QCLL.

FIG. 5 is an enlarged detail cross-section of the body lock ring retaining nut 50 portion of the QCLL. This piece is also known as a "Guide" or "Guide Shoe". The retaining nut 50 has an upper threaded portion 51 and a lower shoulder portion 54. This nut 50 is screwed onto the bottom of the body lock ring and packing housing 40 (see FIG. 7) until the upper shoulders 53 contact the bottom of the body lock ring and packing housing 40, as discussed below. The retaining nut 50 also acts as a spacer in that the lower mandrel is snapped into the body lock ring until the shoulder portion of the lower mandrel (see FIG. 6) contacts the bottom edge 54 of the retainer nut.

Figure 6:
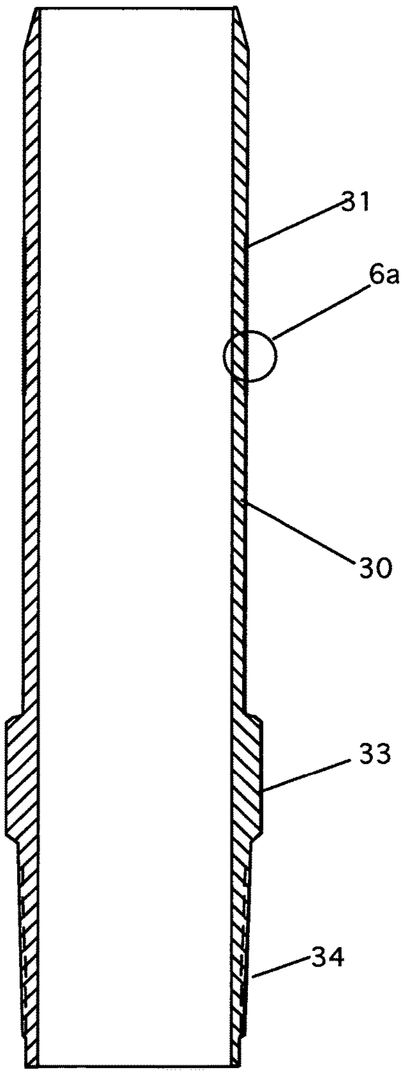
FIG. 6 is an enlarged detail cross-section of the QCLL mandrel portion of the QCLL.
Figure 6A:
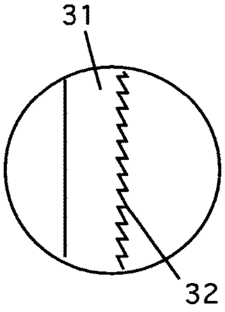
FIG. 6*a* is an enlargement of the threaded portion of the mandrel labeled 6*a*.

FIG. 6 is an enlarged detail cross-section of the QCLL mandrel portion of the QCLL. The mandrel 30 forms the lower portion of the QCLL. It has a long sidewall that is threaded at 31 with directional threads 32 as shown in FIG. 6*a*. The mandrel also has a lower up-set 33 and a bottom-threaded portion 34. The lower threaded portion 34 is used to join the lower mandrel to a lower section of liner. The up-set 33 is used as a stop that contacts the retainer nut, as discussed above. The directional threads 32 are used to attach the body lock ring 50 (see FIGS. 8*a-c*). Note that the packing 70 is shown in place on the mandrel, which is for reference as to the final position of then packing on the mandrel after components are snapped together. FIG. 6*a* is an enlargement of the threaded portion 31, showing the directional threads 32 of the mandrel labeled 6*a*.

Figure 7:
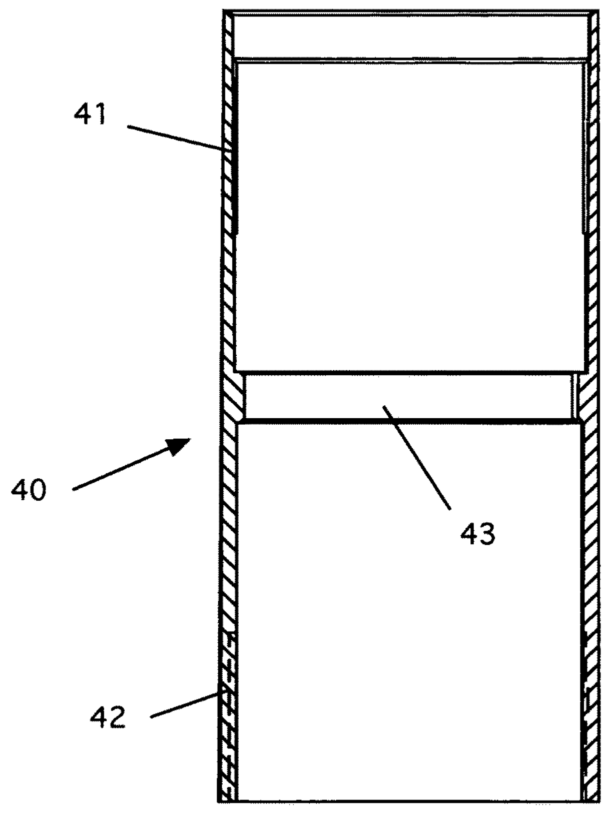
FIG. 7 is an enlarged detail cross-section of the body lock ring and packing housing portion of the QCLL.

FIG. 7 is an enlarged detail cross-section of the body lock ring and packing housing 40 portion of the QCLL. The body lock ring and packing housing is the member that houses the components that lock the upper portion and the lower portion of the QCLL. The body lock ring and packing housing has an upper portion 41 and a lower portion 42. It is sized to accept the packing 70 (installed in portion 41) and body lock ring 60 (installed in portion 42). The packing is installed in portion 41 and held in place with the top sub crossover-packing nut 20 while the BLR is installed in portion 42 and held in place with the retaining nut or guide/guide shoe 50. The center recess portion 43 is used as a stop. It supports the body lock ring, as discussed below, to connect the upper and lower portions of the QCLL. The actual connection is discussed below in the section on FIG. 9.

Figure 8B:
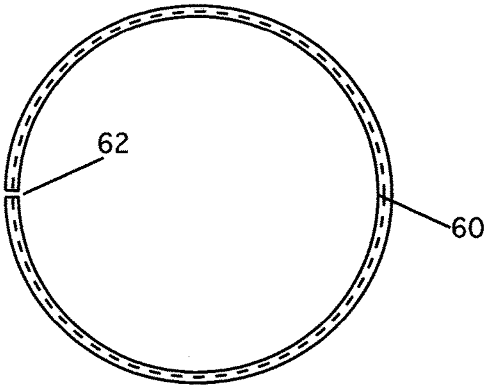
FIG. 8*b* is a top view of the body lock ring portion.
Figure 8C:
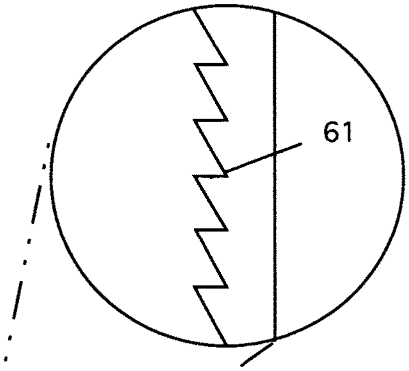
FIG. 8*c* is an enlargement of the threads shown in FIG. 8*a* and labeled 8*c*.
Figure 8A:
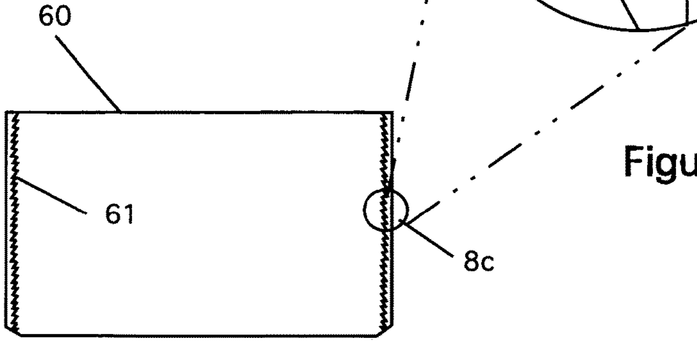
FIG. 8*a* is an enlarged detail cross-section of body lock ring portion of the QCLL.

FIG. 8*a* is an enlarged detail cross-section of the body lock ring portion 60 of the QCLL. FIG. 8*b* is a top view of the lock ring portion. FIG. 8*c* is an enlargement of the threads shown in FIG. 8*a*. In these views, the body lock ring 60 is a short-bodied cylinder that has a set of directional inner threads 61 that engage the directional threads on the lower mandrel as shown in FIG. 6*a*. FIG. 8*b* shows that the inner lock ring 60 has a small cut 62*b* as shown. This small cut is a relief cut, designed to accommodate expansion in the body lock ring as it travels over and engages the threads on the mandrel to accommodate changes in the components due to temperatures and pressure in the well.

Figure 9:
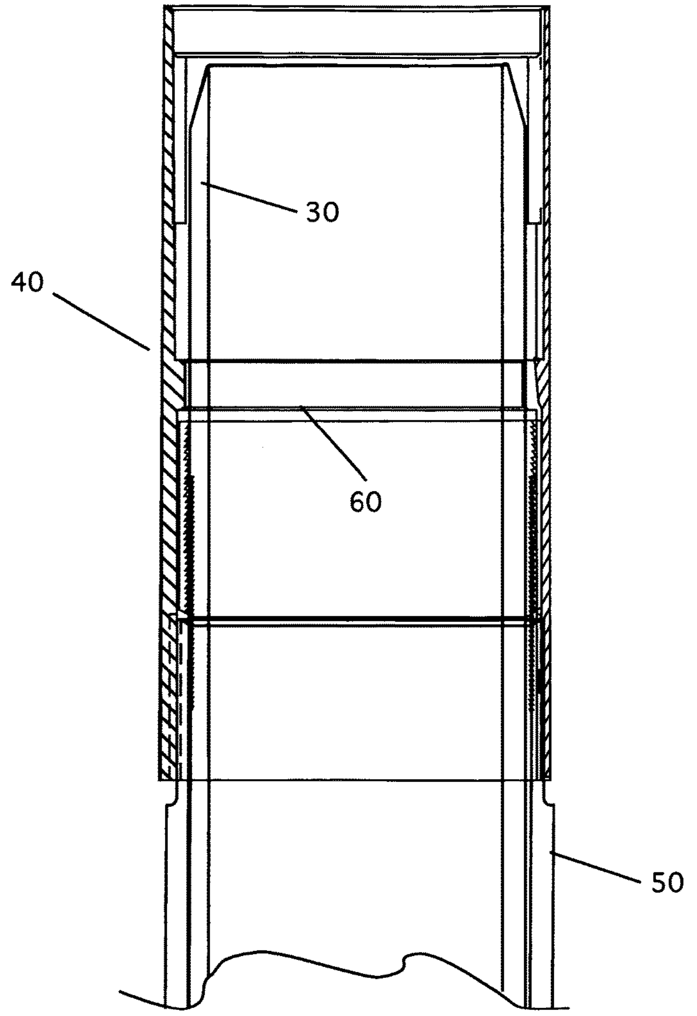
FIG. 9 is a detail drawing showing the boy lock ring and packing engaged on the mandrel.
Figure 9A:
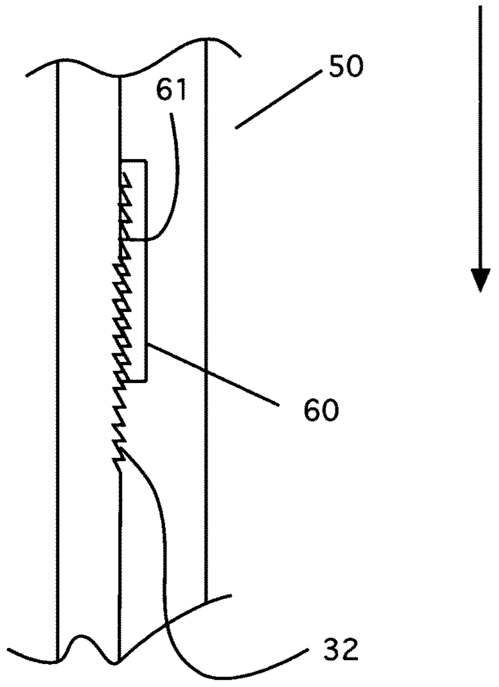
FIG. 9*a* is a detail drawing showing the connection between the directional threads on the body lock ring and the directional threads on the mandrel.

FIG. 9 is a detail drawing that shows the connection between the upper portion of the QCLL and the lower portion of the QCLL. FIG. 9*a* is a detail showing the action of the directional threads on the mandrel and BLR making the connection. As noted above, the mandrel 30 is threaded into the top of a liner piece. The rest of the QCLL is threaded onto the bottom of the next liner piece to be installed. These parts are made up on the surface, where threaded connections can be made up without drilling equipment needed for such connections below ground. The mandrel has directional threads 32 as shown. The body lock ring 60 has a set of directional threads 61 that are designed to engage the threads on the mandrel. The guide 50 holds the body lock ring in the body lock ring housing 40. With the lower section of liner in place in the well, with the mandrel on top, the next section can be lowered into the well. This section is lowered into the well, as discussed below. FIGS. 9 and 9*a* show the connection. The threads on the mandrel and bold lock ring act as ratchets that allow the body lock ring to move down onto the mandrel, but then hold the body lock ring in place once it is installed. In this way, the top and bottom of each QCLL are locked together, eliminating the need for turning equipment to thread the components together as is normally the case in prior art installations. The complete installation is described below.

The QCLL system's anchor is set with a slick line unit using an electronic activated setting tool. The bottom of the retrievable anchor incorporates a conventional liner guide shoe, float collar, and landing collar, and serves as the base platform for the liner while it is being assembled. The top connection of the anchor assembly is the bottom half (mandrel 30) of the QCLL. After setting, the anchor is locked into the casing/tubing. With the bottom half of the first QCLL in place, the first joint of liner can be picked up, with a QCLL top half (body lock ring and crossover and packing nut) installed on the bottom of the first joint of pipe and a mandrel on the top of the joint. As this is run into a well with slick line, a "tag up" operation is done on the lower half of the QCLL. In this operation, the body lock ring and packing engage the lower mandrel, which are picked up to ensure they are latched together. Then the liner is set down using span jars to hit down to make sure the upper half of the QCLL has been driven all the way down over the lower QCLL (i.e., the body lock ring fully engages the mandrels' directional threads and the connection reaches that of FIG. 3), which is installed on the anchor assembly. During the jarring operation a shear release mechanism in the QCLL. Running Tool is activated. Then the pick and the weight loss is noted, leaving the joint attached to the anchor. Now the running tool is ready to be pulled out of the well, and a pick up of another joint of liner is performed. This process is repeated until the desired length of liner is achieved. Each piece of liner is then installed in the same way.

On the top of the last joint of liner a liner deployment sleeve is attached leaving a seal bore receptacle looking up the well. With the QCLL system fully in place the wire line leaves the well.

Using a coil tubing unit rigged up on the well, coil tubing is run in the well to the top of the liner. The liner release and cementing tool with liner wiper plug are made up to the coil tubing, which are then engaged into the deployment sleeve. With the seals engaged, water is pumped into the liner (the QCLL system anchor has a plug pinned in place that will be set to shear at 500 PSI) and pressure is raised to 300 PSI to check the QCLL assemblies for leaks. Then pressure is raised up to 500 PSI to remove the plug from the liner.

At this time it is possible to pick up on the liner and shear release the lock mechanism in the QCLL system anchor (shear value may adjusted to length of the liner or size of the coil). This unseats the anchor from the casing/tubing wall. The entire liner assembly can now be run in hole to the desired depth and then cement is placed in the well to complete the installation.

The QCLL system design is unique in the fact that the inside diameter (ID) of the latch can remain large enough to accommodate a standard liner wiper plug for the weight of the liner being run into the well. To accomplish this, a specially designed running tool was developed. Although there are several snap together latches commercially available, there are none that have an ID that allows the passage of a liner wiper plug system.

Although there have been liners latched together before in oil wells, none have been cemented using a standard liner wiper plug system for the pipe size being run. Using the specially designed QCLL system and running procedures brings a new method of relining old well bores with new pipe that enables the largest ID possible to be maintained for more well intervention work.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

We claim:

1. A quick connect liner latch system comprising:

a) a crossover and packing nut, having a top and a bottom and interior;

b) a lower mandrel having a top portion and a bottom portion, and c) a means for connecting said crossover and packing nut and said lower mandrel, said means being a directionally threaded ratchet connection.

2. The quick connect liner latch system of claim 1 wherein the means for connecting said crossover and packing nut and said lower mandrel comprise:

a) a body lock ring, having a set of directional threads installed therein;

b) a corresponding set of directional threads, formed on said lower mandrel; and c) a retaining nut attached to said lower mandrel;

d) such that said lower mandrel is engaged with said body lock ring by said directionally ratchet threads to form a complete assembly.

3. The quick connect liner latch system of claim 2 further comprising a seal installed on the lower mandrel.

4. The quick connect liner latch system of claim 1 wherein the crossover and packing nut further comprises:

a) a tapered opening formed at the top of said crossover and packing nut;

b) a ledge formed on the interior of said crossover and packing nut onto which a section of liner seats;

c) said crossover and packing nut also having an opening on the bottom of said crossover and packing nut that accepts the body lock ring.

5. The quick connect liner latch system of claim 4 wherein the top of said crossover and packing nut is fitted with a set of threads.

6. The quick connect liner latch system of claim 4 wherein the bottom of said crossover and packing nut is fitted with a set of threads.

7. The quick connect liner latch system of claim 2 wherein the retaining nut includes:

a) an upper portion having a set of threads formed therein; and b) a lower portion having a shoulder portion formed thereon.

8. The quick connect liner latch system of claim 2 wherein the lower mandrel includes:

a) a long sidewall having said corresponding set of directional threads formed thereon for receiving said body lock ring;

b) a lower up-set portion for positioning said retaining nut on said lower mandrel; and c) a set of threads formed on the bottom portion of said lower mandrel.

9. The quick connect liner latch system of claim 2 wherein the body lock ring further includes:

a) an inner portion sized to accept the lower mandrel; and b) a center recess portion used as a stop to position said crossover and packing nut and said lower mandrel within said body lock ring.

10. The quick connect liner latch system of claim 8 wherein the body lock ring portion includes a set of directional threads to slidably engage said corresponding set of directional threads formed on said long sidewall of said lower mandrel in one direction only, such that when said sets of directional threads are engaged said body lock ring portion and said lower mandrel are locked together.

11. The quick connect liner latch system of claim 8 wherein the body lock ring a short-bodied cylinder.

12. The quick connect liner latch system of claim 11 wherein said body lock ring has a small slit formed in said inner lock ring.

13. The quick connect liner latch system of claim 1 wherein:

a) the lower mandrel is attached to a length of liner and extends upward therefrom; and b) the crossover and packing nut is attached to a second length of liner and extends downwardly therefrom.

14. The quick connect liner latch system of claim 5 wherein the crossover and packing nut is threadably attached to a length of liner.

15. The quick connect liner latch system of claim 8 wherein the lower mandrel is threadably attached to a length of liner.

16. The quick connect liner latch system of claim 1 wherein said directionally threaded ratchet connection is formed underground.

* * * * *